(12) United States Patent
Moody et al.

(10) Patent No.: US 6,463,963 B1
(45) Date of Patent: Oct. 15, 2002

(54) ACARACIDAL CARPET AND METHOD OF MAKING THE SAME

(75) Inventors: Von L. Moody, Manchester, TN (US); Jeffrey J. Wright, Cartersville, GA (US)

(73) Assignee: Shaw Industries, Inc., Dalton, GA (US)

( * ) Notice: Subject to any disclaimer, the term of this patent is extended or adjusted under 35 U.S.C. 154(b) by 0 days.

(21) Appl. No.: 10/143,612

(22) Filed: May 10, 2002

(51) Int. Cl.[7] .............................. D03D 15/00; B32B 5/02
(52) U.S. Cl. .................. 139/420 R; 139/399; 139/391; 428/339; 442/123; 442/125
(58) Field of Search .......................... 139/383 R, 399, 139/391, 420 R; 428/147, 159, 297.4, 339, 907; 442/123, 125

(56) References Cited

U.S. PATENT DOCUMENTS

| | | | | |
|---|---|---|---|---|
| 4,048,369 A | * | 9/1977 | Johnson | 424/45 |
| 4,743,448 A | * | 5/1988 | Bahadir et al. | 424/405 |
| 5,527,582 A | * | 6/1996 | Callebert | 424/403 |
| 5,609,727 A | * | 3/1997 | Hansen et al. | 162/158 |
| 6,277,770 B1 | * | 8/2001 | Smith et al. | 428/315.5 |

* cited by examiner

*Primary Examiner*—A. Vanatta
*Assistant Examiner*—Robert Muromoto, Jr.
(74) *Attorney, Agent, or Firm*—Needle & Rosenberg, P.C.

(57) ABSTRACT

The invention relates to an acarcid-resistant carpet wherein an acaracidal compound is fixed at or near the base of the carpet tufts over which an adhesive layer is applied to the carpet tufts into a primary backing material. The invention further relates to methods of making such carpet.

20 Claims, 1 Drawing Sheet

ACARACIDAL CARPET AND METHOD OF MAKING THE SAME

FIELD OF THE INVENTION

The present invention relates to carpet resistant to dust mite infestation and a method for making such carpet. In particular, the invention relates to a carpet having an acaracidal compound durably fixed to the base of the carpet tufts, thereby providing durable protection against dust mite infestation in a tufted carpet product.

BACKGROUND OF THE INVENTION

Carpets are widely used for both residential and commercial applications. As used herein, the term "carpet" includes broadloom products, rugs, as well as carpet tiles and cut carpets.

Finished carpets typically have a number of layers, e.g., a primary backing layer, an adhesive layer, and a secondary backing layer. Carpet is generally produced as tufted carpet where yarn, typically consisting of nylon, polyester, wool or polypropylene, is stitched into a primary backing that is prepared from a polymeric material. An adhesive material is then normally applied to the primary backing and, optionally, a secondary backing is affixed thereto.

It has become well recognized that carpeted floors, in particular, in residences, can harbor allergens. While a myriad of substances may cause allergic reactions in humans, acaracids, e.g., dust mites, are a common cause of allergies in adults and humans. Dust mites feed on dead skin cells from humans and animals that fall off the body and accumulate in the carpet. Such accumulation is generally seen at the carpet base.

A number of treatments have been proposed for ridding carpets of dust mite infestation. Such treatments generally have focused on topical treatment of carpet with acaracidal compounds, such as by shampooing or spraying. However, such treatments are usually only useful as short term solutions to the problem because they lack durability.

A longer term solution to reducing dust mite infestation in carpets has been proposed in U.S. Pat. No. 5,527,582, which disclosure is included herewith in its entirety by this reference. In this patent, an acaracidal compound is included in the adhesive backing that affixes the carpet yarn to the primary backing. The '582 patent discloses that the acaracidal compound is released from the carpet backing by use of a carrier material, such as a plasticizer and/or surfactant. It is stated that the carrier material serves to allow the acaracidal material to migrate from the adhesive backing to the carpet fibers to kill or inactivate acarids present in the carpet. Such carrier material is necessary to achieve the acaracidal action in the carpets therein.

Although the method of the '582 patent provides acaracidal activity that is more durable than that seen in topical treatments, because the acaracidal material migrates from the adhesive backing to the carpet fibers in a continuous and unregulated manner in the method disclosed therein, there will come a time when there remains little or no acaracidal compound in the carpet. Since carpets are generally intended to be useful for several years, the acaracidal activity of a carpet made according to the '582 patent will not last as long as the carpet itself. As a result, the carpet will not be acarid-resistant for the life of the carpet.

In light of the above, it would be desirable to provide an acarid-resistant carpet, wherein the acarid-resistance lasts as long as the useful life of the carpet.

SUMMARY OF THE INVENTION

The invention relates to an acarcid-resistant carpet wherein an acaracidal compound is fixed at or near the base of the carpet tufts over which an adhesive layer is applied to the carpet tufts into a primary backing material. The invention further relates to methods of making such carpet.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
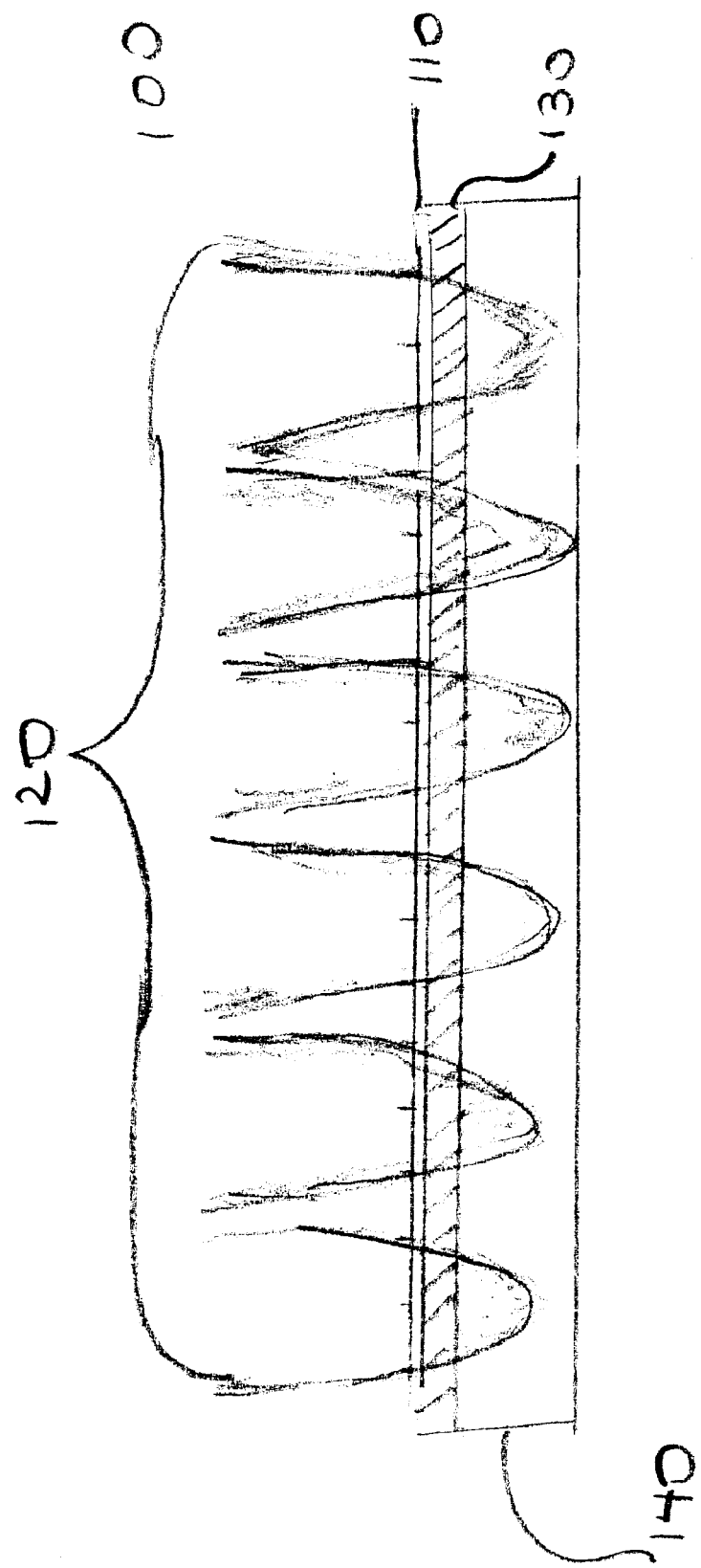
FIG. 1 is a cross-sectional view depicting one embodiment of the carpet of the present invention.
Figure 1:
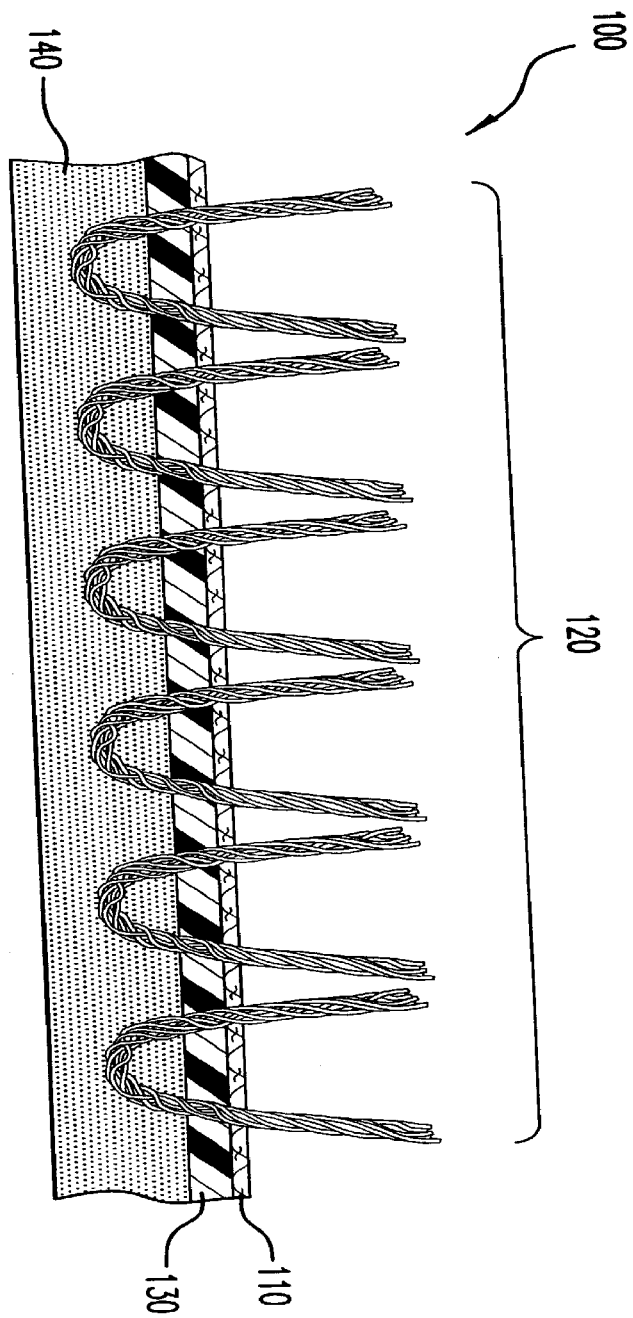

The present invention may be understood more readily by reference to the Figure and the previous and following descriptions. Before the present invention is disclosed and described, it is to be understood that the terminology used herein is for the purpose of describing particular aspects only and is not intended to be limiting.

The present invention may be understood more readily by reference to the following detailed description of preferred embodiments of the invention and the Examples included therein and to the Figure and the previous and following description. It is also to be understood that the terminology used herein is for the purpose of describing particular aspects only and is not intended to be limiting.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims that follow, reference will be made to a number of terms that shall be defined to have the following meanings:

A weight percent of a component, unless specifically stated to the contrary, is based on the total weight of the formulation or composition in which the component is included. Unless otherwise specified a weight percent is based on dry weight of a material 100% total composition.

In one aspect, the present invention relates to a carpet having resistance to dust mite infestation comprising: a) yarn having a plurality of fibers, wherein the yarn is tufted into a primary backing having a face side and a back side, thereby providing a carpet pile on the face side and loops of yarn on the back side of the primary backing; and b) a first polymer layer located proximate to the back side of the carpet. In one aspect, the first polymer layer penetrates loops of yarn and the first polymer layer is in contact with least some of the plurality of fibers.

In a further aspect, the first polymer layer is primarily in contact with the plurality of fibers located primarily at or near the base thereof. In accordance with a major aspect of the invention, the carpet has an acaracidal compound affixed at or near the loops of yarn on the back side of the carpet. To accomplish this aspect of the invention, the acaracidal compound may be incorporated in the first polymer layer that is in contact with the plurality of fibers. In a particular aspect, little or no acaracidal compound is released from the first polymer layer over the useful life of the carpet. In a further aspect, the acaracidal compound does not migrate from the first polymer layer into the body of the carpet fibers. Still further, the carpet backing does not comprise a volatile compound suitable for allowing migration of the acaracidal material through the carpet backing.

While carpets, in particular, broadloom carpets, comprise one aspect of the invention, the arrangement of layers associated with the present invention also relates to carpet tiles and rugs.

The primary backing layer may comprise any material recognized in the art for use as a carpet backing. Specific, non-limiting, examples of materials for primary carpet backings are typically woven or nonwoven fabrics made from one or more of natural or synthetic fibers or yarns including jute, wool, polypropylene, polyethylene, polyamide, polyesters, rayon, or various copolymers. Other materials for the secondary backing layers include Action Bac® (Amoco, Naperville, Ill.) products, as well as needle-punched products.

The fibers extending from the face side (which make up the carpet pile) of the primary backing material can be made with uncut yarn loops, cut yarn loops (a pile of single yarns), or a mixture of cut and uncut yarns. The fibers (yarn) can be made from wool, cotton, nylon, acrylic, poly (trimethyleneterephthalate), polyester, polypropylene and blends thereof. As the fiber material is not critical, other fiber material that may be utilized would be readily apparent to one of skill in the art, i.e., any material recognized in the art for use as a carpet fiber. The fibers can be treated with suitable colorants, e.g., dyes or pigments, either before or after fixing the fibers to the primary backing layer. It will be recognized that the choice of the fiber materials can affect the subsequent layer selections, especially the suitability of any adhesives. Any tufting method can be used to affix the yarn fibers to the primary backing material.

As noted, a first polymer that comprises an acaradial compound may be applied to the primary backing. In one aspect, the first polymer layer comprises a polymer dispersion. The polymer dispersion may be a polymer suitable for fixing the tufted fibers into the primary backing. Non-limiting examples of materials that may be used in the polymer dispersion include, but are not limited to: ethylene acrylic acid, ethylene vinyl acetate, other acrylic materials that are well known to one of ordinary skill in the art, urethane compounds (such as polyurethane), and mixtures of various compounds. The first polymer may or may not comprise styrene-butadiene latex. In a further aspect, the first polymer does not comprise a latex polymer. Still further, the first polymer does not comprise PVC or styrene-butadiene latex.

In one aspect, the polymer dispersion comprising the acaradial compound is applied to the primary backing at from about 0.01 to about 20 ounces per yd$^2$ of carpet to form this first polymer layer. Still further, the first polymer layer comprises from. about 0.1 to about 15 ounces per yd$^2$ of carpet. Yet still further, the polymer layer comprises from about 0.1, 0.5, 1.0, 1.5, 2.0, 2.5, 3.0, 5.0, 7.0, 10.0, 12.0, 15.0, 17.0, and 20.0 ounces per yd$^2$, where any lower value may be used as the lower endpoint and any upper value may be used as the upper endpoint.

It should be noted that, in accordance with the present invention, the polymer dispersion providing the first polymer layer and comprising the acaracidal compound should not provide the primary adhesive mechanism for the carpet fibers. That is, the first polymer is applied to the primary backing at a low solids level and low application weight, as further disclosed herein. While some adhesive functionality may be provided by the polymer dispersion, it is more important that the polymer dispersion comprising, the acaracidal compound function as the vehicle for providing the durable acaracidal activity in the carpet. As such, the polymer dispersion forming the first polymer layer generally serves as a fixing agent that durably binds the acaracidal compound to the base of the carpet fibers, as opposed to operating as the adhesive material binding the carpet fibers to the primary backing. In other words, upon application of the first polymer layer to the yarn, but prior to application of a second polymer layer thereto, it is likely that the yarn will not be sufficiently affixed to the primary backing for general use.

Moreover, in order to be available to kill or inactivate acarids in carpet, it is important for at least some of the acaracidal compound be exposed to the fibers in the base of the carpet pile. One of ordinary skill in the art would recognize that such exposure will require application of either a very thin coating of the polymer dispersion on the carpet fiber or a higher loading of acaracidal compound in the polymer dispersion. Such parameters will depend on the type of carpet fiber, the type of the polymer used in the dispersion and the intended use of the carpeting. Since the selection of such properties will be within the knowledge of one of ordinary skill in the art, they will not be discussed in detail herein. In accordance with the invention herein, the acaracidal compound will be localized at the base of the carpet pile.

The polymer dispersion for the first polymer layer may be aqueous. The polymer may be present at from about 1% to about 30% by weight. Still further, the polymer may be present in the dispersion at from about 1%, 5%, 10%, 15%, 20%, 25%, or 30% by weight as measured by total weight of the polymer dispersion with the balance being water, acaracidal compound and, optionally, processing aid as discussed in more detail herein. Further, the polymer dispersion may comprise other materials well known to one of ordinary skill in the art, including surfactants. However, in accordance with the present invention, it is critical that the mechanism for action of the acaracidal compound not be by release of the compound from the polymer matrix (i.e., first polymer layer). That is, in contrast with the method of the '582 patent, a carrier polymer is not used to release the acaracidal compound for migration into the carpet itself. Rather, as shown in FIG. 1, at least some of the acaracidal compound is exposed at or near the base of the carpet fibers to provide acaracidal activity directly from the first polymer layer. The fixing of the acaracidal compound directly in a precoat-type layer, as opposed to release from a polymer matrix as in the '582 patent, is a previously unknown method of providing acaracidal activity in a carpet. Moreover, it is previously unknown that acaracidal compounds could be durably fixed at or near the base of carpet fibers to provide a carpet with acaricidal activity.

In a further aspect, the polymer dispersion forming the first polymer layer may comprise from about 0.15 to about 30% by weight of an acaricidal compound, as measured by actual weight of acaracidal compound in the dispersion. In yet further aspects, the polymer dispersion may comprise from about 0.5, 1.0, 2.5, 5.0, 7.5, 10.0, 12.5, 15.0, 17.5, 20.0, 22.5, 25.0, 27.5 or 30.0 as measured by weight of the active ingredient, where any lower value may be used as the lower endpoint and any upper value may be used as the upper endpoint, as appropriate.

The acaracidal compounds useful in the invention may be of any type known to one of ordinary skill in the art. Such materials, include, but are not limited to, pyrethrenoids of the "methrin" type, such as: permethrin, cypermethrin, deltamethrin, 5-(phenylmethyl)-3-furanylmethyl, (1 R,trans-(+)-2,2-dimethyl-3-(2-methyl-1-propenyl) cyclopropane-carboxylate (bioresmethrin). Also suitable are compounds of the benzene-acetate type such as cyano-(3-phenoxybenzyl)methyl, 4-chloro (.alpha.)-(1-methylethyl) benzene-acetate (fenvalerate) or organophosphorus compounds such as dibrom, endosulfan or chlorfenvinphos. Further examples include, [2-[2-(p-tert-butylphenoxy) isopropoxy]isopropyl-2-chloroethyl sulfide}, (2,4-dinitro-6-sec-butylphenyl dimethylacrylate), (isopropyl 4,4-dichlorobenzylate), (ethyl 4,4-dichlorobenzylate), [1,1-bis (p-chlorophenyl)-2,2,2-trichloroethanol], (ethyl-benzoyl-3-chloro-2,6-dimethoxybenzohydroxymate), (tricyclohexyltin hydroxide) and [2-(p-tert-butylphenoxy)cyclohexyl-2-propinyl sulfite. Particular examples of permethrin that may be used are Permanone® WP 25 (AgrEvo, Montvale, N.J.), and Smite® (Medachieve Inc., Washington Courthouse, Ohio). Additionally, borate-type acaricidal compounds such as those disclosed in U.S. Pat. Nos. 5,587,221 and 5,672,362 may be used, the disclosures of which are incorporated herein in their entireties by this reference. One borate-type material that may be used in the invention herein is supplied as Dustmitex® (The Ecology Works, San Rafael, Calif.).

It will be further recognized that since the polymer dispersion is applied to the back side of the primary backing, it is necessary for the polymer dispersion to be of appropriate viscosity etc. such that a suitable amount of polymer dispersion will be obtained around the base of the yarn. It has been found in accordance with the invention herein that, at the loading amounts disclosed herein, there is no noticeable change in the flow properties of the polymer dispersion. Accordingly, existing methods of applying adhesive precoat materials to carpets may be used with little or no modification. Examples of such methods include spray or foam application methods.

To allow affixing of the yarn to the primary backing, the carpet should also include a second polymer layer located proximate to the first polymer layer. The second polymer layer may be comprised of an adhesive polymer. In separate aspects, the second polymer layer comprises one or more of: vinyl acetate-ethylene, polyethylene, polyurethane, polyvinyl chloride, styrene butadiene latex, vinylidiene chloride, vinyl chloride, cellulose acetate butyrate, vinyl chloride-acrylonitrile, vinyl acetate-acrylic acid, vinylidiene chloride-acrylonitrile, acrylic acid-methacrylic acid, butadiene-acrylonirile, acrylic acid-styrene, acrylonitrile-styrene, acrylonitrile-alkyl acetate, vinyl acetate acrylate ester and acrylonitrile butadiene styrene.

An additional layer may be positioned proximate to the outer surface of the second polymer layer. Such an additional layer may be located adjacent to the second polymer layer. For example, the additional layer can strengthen the carpet, pad the carpet and/or minimize fuzzing of the carpet. Additionally, the additional layer can stabilize the carpet by counteracting tension applied to the primary layer when the carpet is stretched. The additional layer can, for example, include metal stabilizer mesh, foam, fiberglass, or combinations of these materials. Any alternative additional layers may be readily apparent to one of ordinary skill in the art.

Another optional layer may be a secondary backing. As used herein, secondary backing is a different structure from the second polymer layer. If directly attached, the secondary backing will be attached adhesively to the primary backing. If indirectly attached, the adhesive will be attached to an intermediate additional layer and the intermediate layer will be attached to the secondary layer. The secondary backing can be made of a variety of materials. Such materials include PVC, polyurethane, polyethylene or polypropylene.

The backing materials (other than the acaracidal compound-containing first polymer layer) can include one or more additives, such as, flame retardants (including calcium carbonate, magnesium carbonate, and aluminum trihydrate), antioxidants, antimicrobials, smoke suppressants, wetting agents, frothing aids, and other trace elements.

Reference is now made to one aspect of the invention illustrated by FIG. 1 of the drawings. In FIG. 1, the carpet 100 has a primary backing layer 110 with a tufted pile of fibers 120, the first polymer layer 130 which comprises an acaracidal compound and an adhesive layer 140.

While carpets comprise one aspect of the present invention, the present invention can also be applied to manufacture carpet tiles. Manufacturing of carpet tiles may be by any method generally recognized in the art, for example, by the method disclosed in U.S. Pat. No. 5,324,562 the disclosure of which is incorporated herein in its entirety by this reference.

Experimental

The following examples are put forth so as to provide those of ordinary skill in the art with a complete disclosure and description of how the methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° F or is at ambient temperature, and pressure is at or near atmospheric.

TABLE 1 using Permanone 25 wp as active ingredient in EAA

| Sample # | Acaricide level in Pre-Precoat | Substrate | Pre-precoat | Precoat | Secondary Backing |
| --- | --- | --- | --- | --- | --- |
| 2 | 0.067 oz/sy | Greige goods | 1 oz/sy EAA | None | None |
| 4 | 0.067 oz/sy | Greige goods | 1 oz/sy EAA | 19 oz/sy 177 | None |
| 6 | 0.067 oz/sy | Greige goods | 1 oz/sy EAA | 19 oz/sy 177 | Polyurethane |

TABLE 2 using Permanone 25 wp as active ingredient in EAA

| Sample # | Acaracide level in Pre-Precoat | Substrate | Pre-precoat | Precoat | Secondary Backing |
|---|---|---|---|---|---|
| 1 | 0.067 oz/sy | Greige goods | 1 oz/sy EAA | 24 oz/sy 170 | PVC |
| 3 | 0.067 oz/sy | Greige goods | 1 oz/sy EAA | 19 oz/sy 177 | Polyurethane foam |
| 5 | 0.067 oz/sy | Greige goods | 1 oz/sy EAA | 19 oz/sy 177 | Polyolefin |

TABLE 3 using Permanone 25 wp (P 25) or Dustmitex (DM) as active ingredients

| Sample # | Acaracide level in Pre-Precoat | Substrate | Pre-precoat | Precoat | Secondary Backing |
|---|---|---|---|---|---|
| 1 | 0.001 oz/sy P25 in EAA | Greige goods | 1 oz/sy EAA | 19 oz/sy 177 | PVC |
| 3 | 0.24 oz/sy DM in EAA | Greige goods | 1 oz/sy EAA | 19 oz/sy 177 | Polyolefin |

TABLE 4

Permanone 25 wp active ingredient in EAA

| Sample # | Acaracide level in Pre-Precoat | Substrate | Pre-precoat | Precoat | Secondary Backing |
|---|---|---|---|---|---|
| 3 | 0.01 oz/sy | Griege goods | 1 oz/sy EEA | 19 oz/sy 178 | Polyolefin |
| 4 | 0.01 oz/sy | Griege goods | 1 oz/sy EEA | 19 oz/sy 178 | Polyolefin |
| 5 | 0.01 oz/sy | Griege goods | 1 oz/sy EEA | 19 oz/sy 178 | Polyolefin |
| 6 | 0.01 oz/sy | Griege goods | 1 oz/sy EEA | 19 oz/sy 178 | Polyolefin |

Definitions goods: tufted carpet (using woven polypropylene primary backing)
177: 150 ATH (aluminum trihydrate) loaded VAE (vinyl acetate ethylene) latex compound
170: 275 calcium carbonate loaded VAE (vinyl acetate ethylene) latex compound
178: 150 ATH loaded BDA (butadiene acrylic) latex compound
Pre-Precoat—First polymer layer having acaracidal compound
Pre-coat—adhesive layer
All acaracidal amounts are based upon actual amount active ingredient in pre-precoat.

| Application Methods | |
|---|---|
| Pre-Precoat | Direct Sprayed |
| Precoat | Direct Foamed |
| Secondary | Extruded |

RESULTS

When visually examined, the first polymer layer ("pre-precoat") including the acaracidal compound was localized at or near the base of the carpet tufts. Further, when coated with an adhesive polymer to form the second polymer layer, the tufts were snug and locked into the primary backing. Thus, it has been shown that an acaracidal compound may be included in a first polymer layer without causing deterioration of the first polymer layer's ability to provide a strong locking of tufts in the finished carpets.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

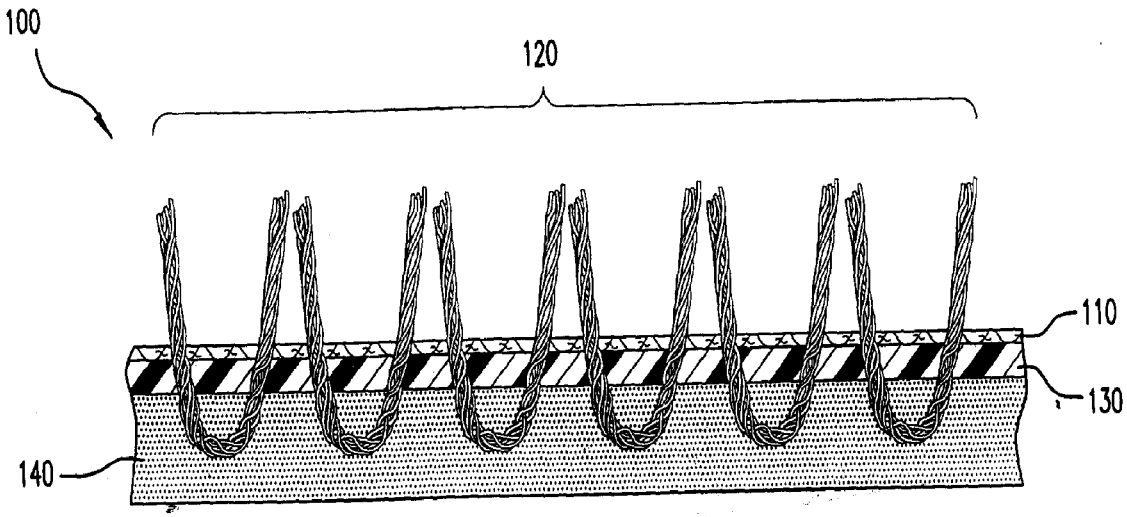

What is claimed is:

1. A carpet having resistance to infestation by acarids comprising:
   a. yarn having a plurality of fibers, wherein the yarn is tufted into a primary backing having a face side and a back side, thereby providing a carpet pile on the face side and loops of yarn on the back side of the primary backing wherein the carpet pile has a base proximate to the loops of yarn; and
   b. a first polymer layer located proximately to the back side, wherein the first polymer layer comprises from 0.1 to about 10.0 ounces per $yd^2$ of a polymer dispersion, wherein the polymer dispersion comprises from about 0.15 to about 30% by weight of an acaracidal compound (as measured by weight of the compound), wherein the first polymer layer penetrates the loops of yarn, and wherein the first polymer layer is in contact with at least some of the plurality of fibers thereby providing a carpet with an acaracidal compound fixed at or near the base of the carpet pile.

2. The carpet of claim 1, wherein a second polymer layer is located adjacent to an outer surface of the first polymer layer, thereby forming an adhesive layer.

3. The carpet of claim 1, wherein the first polymer layer is present on the back side of the primary backing in an amount of from about 0.5 to about 5.0 ounces per $yd^2$.

4. The carpet of claim 1, wherein the polymer dispersion is substantially free of a carrier polymer, thereby providing a carpet having an acaracidal compound durably fixed at or near the loops of yarn at the base of the carpet pile.

5. The carpet of claim 1, wherein the polymer dispersion comprises one or more of: ethylene acrylic acid, ethylene vinyl acetate or polyethylene.

6. The carpet of claim 1, wherein the polymer dispersion comprises water.

7. The carpet of claim 1, wherein the polymer dispersion comprises from about 10 to about 75% by weight of polymer as measured by total weight of the dispersion.

8. The carpet of claim 1, wherein the acaracidal compound comprises from about 1.0 to about 15% by weight by weight of polymer dispersion.

9. The carpet of claim 1, wherein the aracidal compound comprises permethrin or a borate-type material.

10. The carpet of claim 2, wherein the second polymer layer comprises one or more of: vinyl acetate-ethylene, polyethylene, polyurethane, polyvinyl chloride, vinylidiene chloride, styrene butadiene latex, vinyl chloride, cellulose acetate butyrate, vinyl chloride-acrylonitrile, vinyl acetate-acrylic acid, vinylidiene chloride-acrylonitrile, acrylic acid-methacrylic acid, butadiene-acrylonirile, acrylic acid-styrene, acrylonitrile-styrene, acrylonitrile-alkyl acetate, vinyl acetate acrylate ester or acrylonitrile butadiene styrene.

11. A method of making a carpet having resistance to dust mite infestation comprising the steps of:
   a. providing a yarn comprising a plurality of fibers;
   b. tufting the yarn into a primary backing having a face side and a back side, thereby providing a carpet pile on the face side and loops of yarn on the back side of the primary backing thereby forming a carpet base proximate to the loops of yarn; and
   c. applying to the back side of the primary backing a first polymer layer comprising from about 0.1 to about 10.0 ounces per $yd^2$ of a polymer dispersion, wherein the polymer dispersion comprises from about 0.10 to about 30% by weight (as measured by weight of the compound) of an acaracidal compound, wherein the first polymer layer penetrates the loops of yarn and wherein the first polymer layer is in contact with the carpet base, thereby providing a carpet having an acaracidal compound fixed at or near the carpet base.

12. The method of claim 11, wherein a second polymer layer is applied proximate to an outer surface of the first polymer layer.

13. The method of claim 11, wherein the first polymer layer is applied to the back side of the primary backing in an amount of from about 0.5 to about 5.0 ounces per $yd_2$.

14. The method of claim 11, wherein the polymer dispersion is substantially free of a carrier polymer, thereby providing a carpet having an acaracidal compound durably fixed at or near the loops of yarn at the base of the carpet pile.

15. The method of claim 11, wherein the polymer dispersion comprises one or more of: ethylene acrylic acid, ethylene vinyl acetate or polyethylene.

16. The method of claim 11, wherein the polymer dispersion comprises water.

17. The method of claim 11, wherein the polymer dispersion comprises from about 10 to about 75% by weight of polymer as measured by total weight of the dispersion.

18. The method of claim 11, wherein the acaracidal compound comprises from about 1.0 to about 15.0% by weight of the polymer dispersion.

19. The method of claim 11, wherein the acaracidal compound comprises permethrin or a borate-type material.

20. The method of claim 12, wherein the second polymer layer comprises one or more of: vinyl acetate-ethylene, polyethylene, polyurethane, polyvinyl chloride, vinylidiene chloride, styrene butadiene rubber, vinyl chloride, cellulose acetate butyrate, vinyl chloride-acrylonitrile, vinyl acetate-acrylic acid, vinylidiene chloride-acrylonitrile, acrylic acid-methacrylic acid, butadiene-acrylonirile, acrylic acid-styrene, acrylonitrile-styrene, acrylonitrile-alkyl acetate, vinyl acetate acrylate ester or acrylonitrile butadiene styrene.

* * * * *

UNITED STATES PATENT AND TRADEMARK OFFICE
CERTIFICATE OF CORRECTION

PATENT NO.      : 6,463,963 B1
DATED           : October 15, 2002
INVENTOR(S)     : Moody et al.

It is certified that error appears in the above-identified patent and that said Letters Patent is hereby corrected as shown below:

The title page, showing an illustrative figure, should be deleted and substituted therefor the attached title page.

Delete Figure 1 and substitue therefor the Figure, consisting of Figure 1, as shown on the attached pages.

Signed and Sealed this

Fifteenth Day of April, 2003

JAMES E. ROGAN
*Director of the United States Patent and Trademark Office*

United States Patent
Moody et al.

(10) Patent No.: US 6,463,963 B1
(45) Date of Patent: Oct. 15, 2002

(54) ACARACIDAL CARPET AND METHOD OF MAKING THE SAME

(75) Inventors: Von L. Moody, Manchester, TN (US); Jeffrey J. Wright, Cartersville, GA (US)

(73) Assignee: Shaw Industries, Inc., Dalton, GA (US)

( * ) Notice: Subject to any disclaimer, the term of this patent is extended or adjusted under 35 U.S.C. 154(b) by 0 days.

(21) Appl. No.: 10/143,612

(22) Filed: May 10, 2002

(51) Int. Cl.[7] ............................ D03D 15/00; B32B 5/02
(52) U.S. Cl. .................. 139/420 R; 139/399; 139/391; 428/339; 442/123; 442/125
(58) Field of Search ............................ 139/383 R, 399, 139/391, 420 R; 428/147, 159, 297.4, 339, 907; 442/123, 125

(56) References Cited

U.S. PATENT DOCUMENTS

| | | | | |
|---|---|---|---|---|
| 4,048,369 A | * | 9/1977 | Johnson | 424/45 |
| 4,743,448 A | * | 5/1988 | Bahadir et al. | 424/405 |
| 5,527,582 A | * | 6/1996 | Callebert | 424/403 |
| 5,609,727 A | * | 3/1997 | Hansen et al. | 162/158 |
| 6,277,770 B1 | * | 8/2001 | Smith et al. | 428/315.5 |

* cited by examiner

*Primary Examiner*—A. Vanatta
*Assistant Examiner*—Robert Muromoto, Jr.
(74) *Attorney, Agent, or Firm*—Needle & Rosenberg, P.C.

(57) ABSTRACT

The invention relates to an acarcid-resistant carpet wherein an acaracidal compound is fixed at or near the base of the carpet tufts over which an adhesive layer is applied to the carpet tufts into a primary backing material. The invention further relates to methods of making such carpet.

20 Claims, 1 Drawing Sheet